United States Patent [19]

Strauch et al.

[11] Patent Number: 5,745,551
[45] Date of Patent: Apr. 28, 1998

[54] TELECOMMUNICATION APPARATUS FOR RECEIVING, STORING AND FORWARDING A PLURALITY OF VOICE SIGNALS TO A WIRELESS NETWORK, IN RESPONSE TO A CONTROL SIGNAL THEREFROM

[75] Inventors: Roger Strauch, Piedmont; Daniel H. Miller, Kensington, both of Calif.

[73] Assignee: TCSI Corporation, Berkeley, Calif.

[21] Appl. No.: 144,127

[22] Filed: Oct. 27, 1993

[51] Int. Cl.$^6$ .............................. H04M 11/00; H04M 1/64
[52] U.S. Cl. .................. 379/58; 379/61; 379/84; 379/87
[58] Field of Search .................. 379/58, 59, 63, 379/88, 61, 87, 67, 79, 80, 82, 84, 89; 455/38.1, 38.3, 343; 370/111, 118

[56] References Cited

U.S. PATENT DOCUMENTS

| | | |
|---|---|---|
| 3,703,607 | 11/1972 | Cohen . |
| 4,481,382 | 11/1984 | Villa-Real . |
| 4,495,647 | 1/1985 | Burke et al. ............... 455/38.1 |
| 4,998,272 | 3/1991 | Hawkins, Jr. et al. . |
| 5,003,576 | 3/1991 | Helferich ................... 379/63 |
| 5,075,894 | 12/1991 | Iwase et al. . |
| 5,105,197 | 4/1992 | Clagett . |
| 5,204,986 | 4/1993 | Ito et al. ................... 455/343 |

OTHER PUBLICATIONS

ICOM, INC., 1992, brochure (including specifications).

*Primary Examiner*—Curtis Kuntz
*Assistant Examiner*—Michael B. Chernoff
*Attorney, Agent, or Firm*—Ronald L. Yin; Limbach & Limbach

[57] ABSTRACT

In the present telecommunication system, a wired network receives a plurality of voice signals and transmits them. A first communication device is connected to the wired network. The first communication device includes means for receiving the plurality of voice signals, a first storage means for storing the plurality of voice signals, a first playback means for retrieving a portion of the stored plurality of voice signals, and a first control means for controlling the first playback means to transmit the retrieved portion of voice signals. The portion of the stored plurality of voice signals which are retrieved are then placed onto a wireless network which is in communication with a plurality of portable units. Each of the portable units has capability of communicating with the wireless network for receiving the voice signals therefrom, for storing a received voice signal, and for playing back the stored voice signal. Finally, the first communication unit causes the stored plurality of voice signals stored on the first communication unit to be transmitted to a different one of the plurality of portable units.

30 Claims, 3 Drawing Sheets

TELECOMMUNICATION APPARATUS FOR RECEIVING, STORING AND FORWARDING A PLURALITY OF VOICE SIGNALS TO A WIRELESS NETWORK, IN RESPONSE TO A CONTROL SIGNAL THEREFROM

TECHNICAL FIELD

The present invention relates to a telecommunication system and more particularly to a system for storing and forwarding a plurality of voice signals, using a plurality of communication devices each having a storage unit.

BACKGROUND OF THE INVENTION

Telecommunication systems are well known in the art. Heretofore, public carrier telecommunication networks have been of two forms, wired and wireless networks, with the latter being a more modern development. In a wireless network or a cellular network, the wireless network is attached to the wired network for communication therewith. A user in a wireless local cell can communicate with other users outside of that local cell through the user's wireless network, onto the wired network, and then back to the remote wireless network in the remote cell.

Modern voice processing technology has also advanced. Thus, voice signals can now be recorded and retrieved through devices that are sophisticated forms of recording and playback units.

Prior art in these areas can be found in U.S. Pat. Nos. 3,703,607; 4,481,382; 5,075,894; and 5,105,197. In U.S. Pat. No. 4,998,272, an apparatus which delivers voice messages in non-real time is disclosed. See, for example, Col. 4, lines 40–45. In U.S. Pat. No. 5,003,576, the reference discloses the storage of information and the forwarding of the information onto a cellular network. See, for example, Col. 4, lines 1–20; Col. 5, lines 1–5; Col. 5, lines 40–50; and Col. 5, lines 65–70.

Heretofore, no telecommunication system h as offered the advantages and convenience of a wireless network, permitting the user to roam freely, as well as having the capability of storing and forwarding voice messages to a user in a wireless network who is mobile, in an efficient manner.

SUMMARY OF THE INVENTION

In the present invention, a telecommunication apparatus receives and forwards a plurality of voice signals. The apparatus has a wired network for receiving the plurality of voice signals and for transmitting the plurality of voice signals. A first communication means is connected to the wired network. The first communication means includes means for receiving the plurality of voice signals transmitted on the wired network and a first storage means for storing the received plurality of voice signals. A first playback means retrieves a portion of the stored plurality of voice signals and a first control means controls the first playback means to transmit the retrieved portion of voice signals to a wireless network which is in communication with the first communication means. The wireless network receives the portion of voice signals from the first communication means and transmits the portion of voice signals. A plurality of second communication means is in communication with the wireless network to receive one of the portion of voice signals. Each of the plurality of second communication means has a second storage means for storing a received one voice signal, a second playback means for retrieving a voice signal stored on the second storage means, and a second control means controlling the second playback means. Finally, the first control means in the first communication means controls the first playback means to transmit the portion of the stored voice signals to the wireless network with each voice signal of the portion transmitted to a different one of the plurality of second communication means, when the wireless network has the capacity to receive the portion of the stored voice signals.

DETAILED DESCRIPTION OF THE DRAWINGS

DETAILED DESCRIPTION OF THE DRAWINGS

Figure 1:
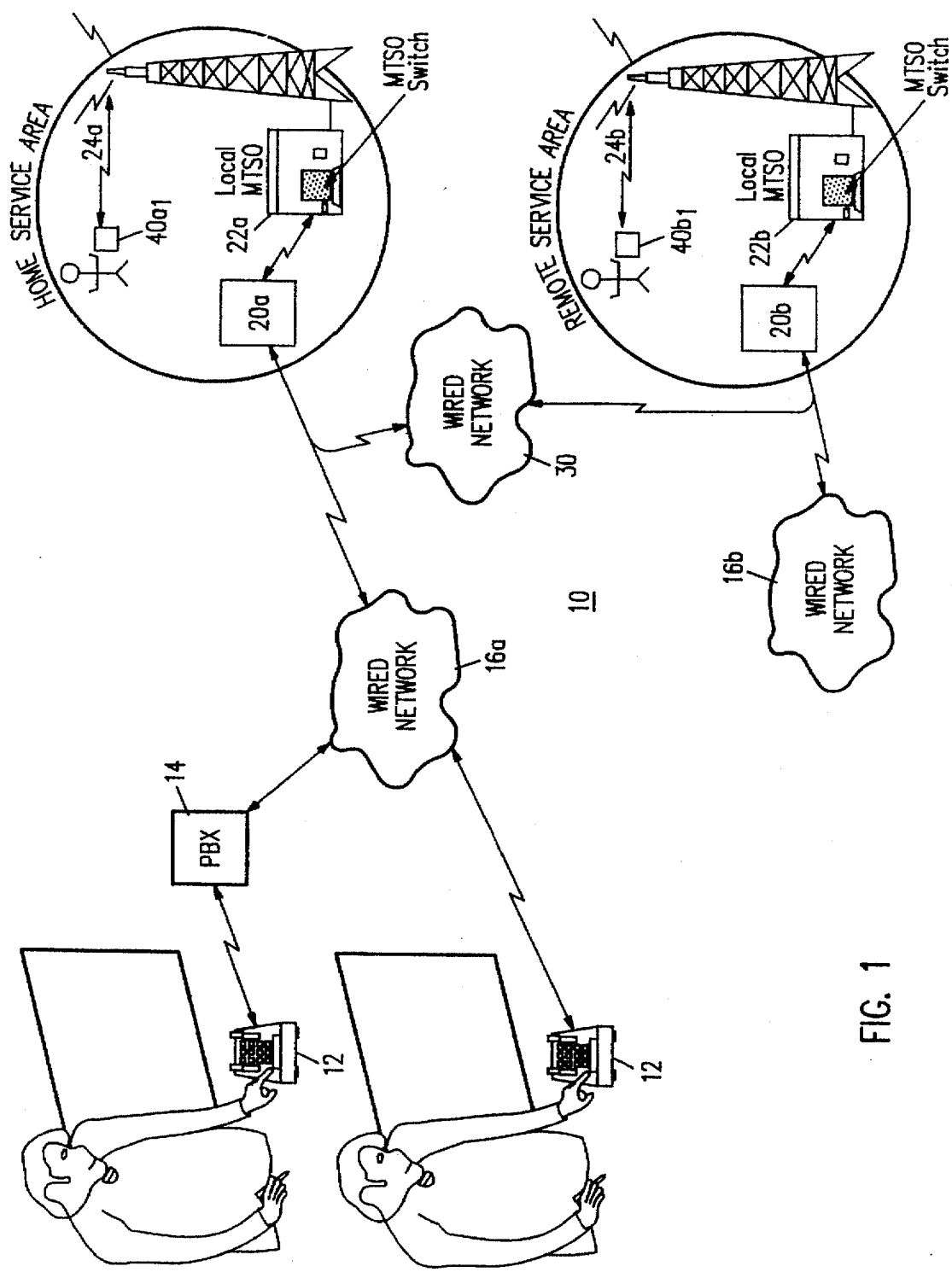
FIG. 1 is a schematic block diagram of the telecommunication system of the present invention.

Referring to FIG. 1 there is shown a schematic block diagram of a telecommunication system 10 of the present invention. The system 10 receives and forwards a plurality of voice signals. Each of the voice signals can be transmitted from a telephone 12 to a local wired network 16a, either directly, or through a conventional PBX 14. From the local wired network 16a, the plurality of voice signals are then transmitted to a first, or local communication device 20a, which is connected to the local wired network 16a. A detailed description of the local communication device 20a will be discussed hereinafter. The local communication device 20a is connected to its local wireless network 24a. In the preferred embodiment, the local wireless network 24a is a cellular network. The local communication device 20a is connected to the local wireless network 24a through the control unit 22a or the mobile telephone service office 22a of the local wireless network 24a. The local wireless network 24a is in communication with individuals within its service area each carrying a portable communication device 40a1. A plurality of the portable communication devices 40a (1 ... n) with each carried by a user in the local service area of the local wireless network 24a can be served by the local wireless network 24a.

Alternatively, one or more of the plurality of voice signals received by the local wired network 16a may be intended for one or more users who are in a wireless network 24b far removed from the local wired network 16a. In that event, the local communication device 20a is also connected to a long distance carrier wired network 30 for transmitting the one or more voice signals to a second, or remote communication device 20b. The remote communication device 20b is identical to the local communication device 20a. The remote communication device 20b receives one or more of the voice signals from the long distance wired network 30. The remote communication device 20b is also connected to its associated mobile telephone service office 22b which is then in communication with its remote wireless network 24b. The remote wireless network 24b is in communication with a plurality of users in its service area with each of those users carrying a portable communication device 40b1. Each of the portable communication device 40b1 in the remote service area is identical to the portable communication device 40a1 of the local service area.

Each of the local wired network 16a, the remote wired network 16b, and the long distance wired network 30 is capable of receiving and transmitting either analog voice signals or digital voice signals, such as ISDN signals. Further, the local wireless network 24a or the remote wireless network 24b can also receive and transmit either analog or digital encoded RF voice signals.

Figure 2:
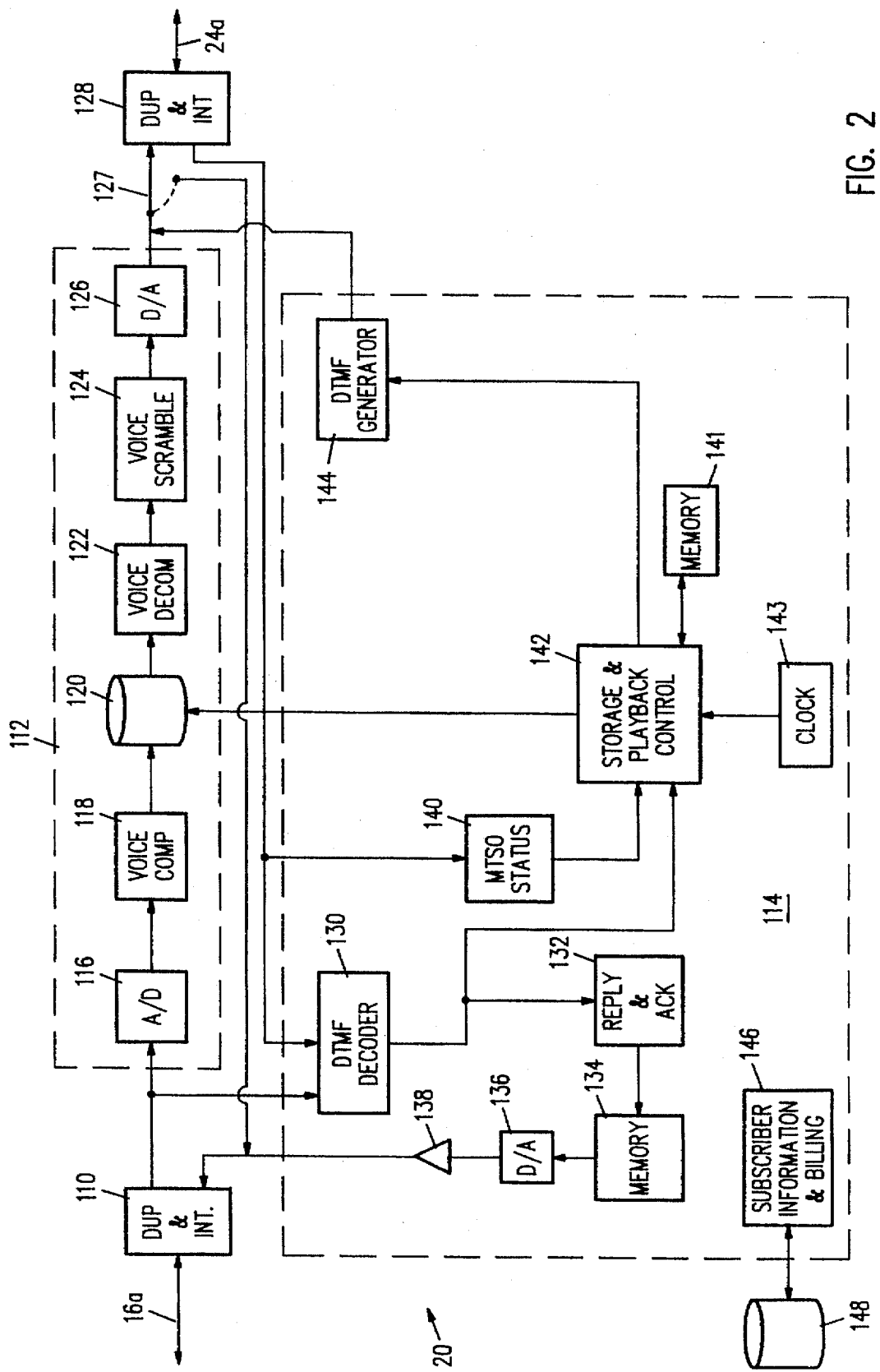
FIG. 2 is a schematic block diagram of a first communication device of the present invention, used in the telecommunication system shown in FIG. 1.

Referring to FIG. 2, there is shown a schematic block diagram of the communication device 20 of the present invention. The communication device 20 interfaces with the wired network 16a through a first duplexer and interface module 110. The voice signals received from the wired network 16a are stored in a storage means 112. The storage means 112 comprises an A-to-D converter 116 (in the event the signals received from the wired network 16a is in analog format). From the analog-to-digital converter 116, the digitized voice signals are then compressed by a compressor 118. The compressor 118 compresses the digitized voice signal so that storage requirement is lowered. The digitized, compressed voice signals are then stored on a disk drive 120. From the disk drive 120, the stored voice signals can be retrieved and are first decompressed by a voice decompressor 122. The digitized voice signals is then optionally scrambled by a voice scrambler 124. Finally, if the voice signals retrieved from the disk 120 are to be placed onto an analog wired or wireless network, the voice signals are then converted into analog form by a D-to-A converter 126. The analog voice signals are then supplied to a switch 127, which is under the control of the controller 114 (discussed hereinafter). From the switch 127, the signals are supplied to either a second duplexer and interface unit 128 which interfaces with the wireless network 24a through the local MTSO 22a, or are supplied to the first duplexer and interface unit 110 to interface with the wired long distance network 30.

The communication device 20 also has a controller 114. The controller 114 has a DTMF decoder 130. Since the signals from the wired network 16a or the wireless network 24a may be in the nature of DTMF tones, these signals are supplied to the DTMF decoder 130. The output of the DTMF decoder 130 is supplied to a reply and acknowledgement unit 132. The reply and acknowledgement unit 132 controls a solid state memory 134 which has a plurality of prerecorded messages in digitized format. The output of the memory 134 is supplied to a D-to-A converter 136 for conversion into analog signals. The analog signals are then amplified by an amplifier 138 and are supplied to the first duplex and interface unit 110 for transmission back onto the wired network 16a. The operation of this portion of the controller 114 will be described in greater detail hereinafter.

The controller 114 also comprises an MTSO status check 140. The MTSO status check 140 receives the control signals from the MTSO unit 22a through the second duplex and interface unit 128. The output of the MTSO status check 140 is supplied to a storage and playback control 142 which controls the disk 120. The storage and playback control 142 also controls a DTMF generator 144. The output of the DTMF generator 144 is also supplied to the switch 127 for connection to either the first duplex and interface unit 110 for forwarding to the wired local networks 16 or wired long distance network 30, or to the wireless network 24a. Finally, a clock 143 supplies the timing signals to the storage and playback control 142. The storage and playback control 142 also has its associated memory 141. In addition, the controller 114 also comprises a subscriber information and billing module 146 which controls another disk 148 which contains accounting and billing information.

Figure 3:
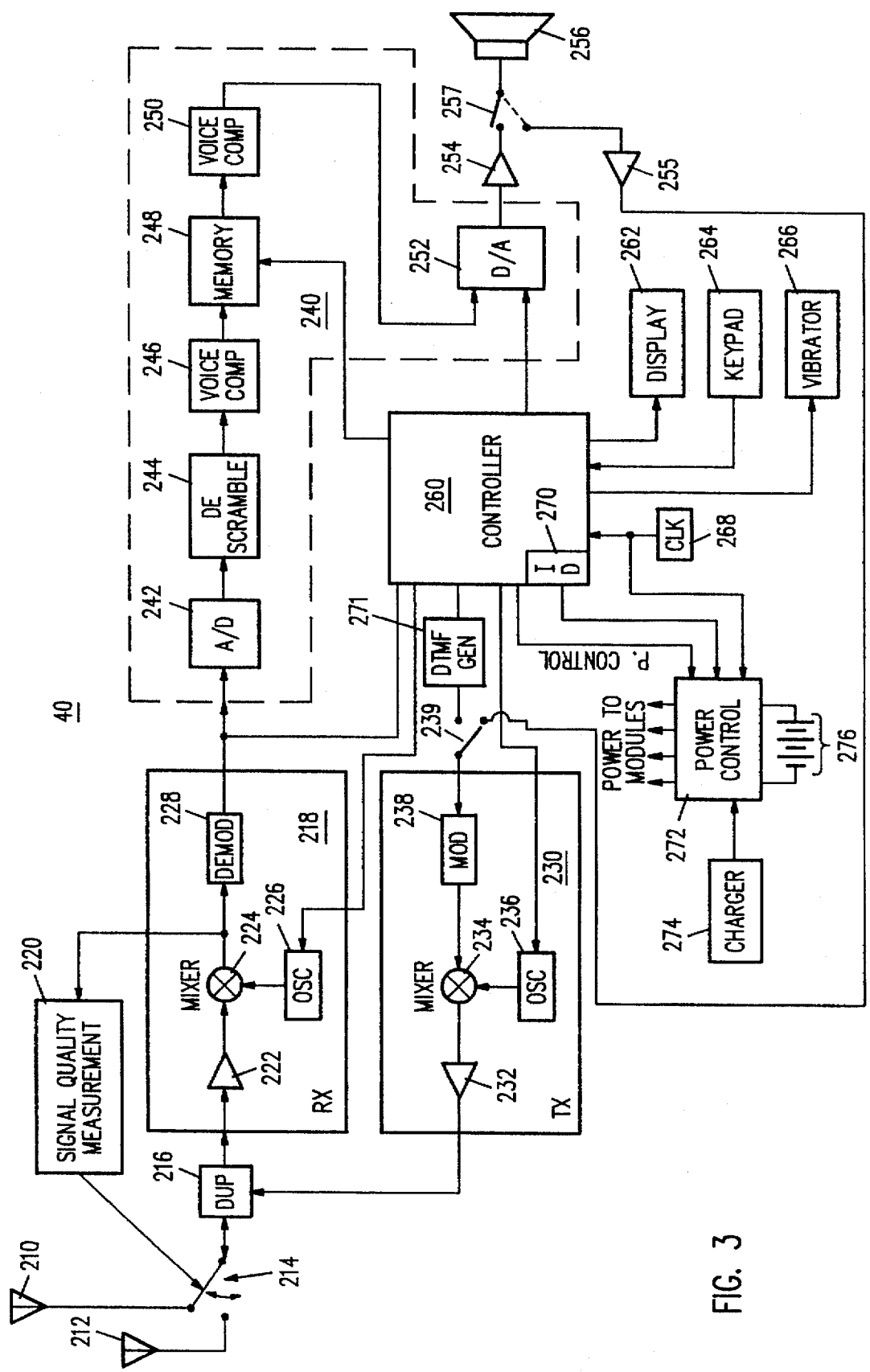
FIG. 3 is a schematic block diagram of a second communication device, of the present invention, used in the telecommunication system shown in FIG. 1.

Referring to FIG. 3 there is shown a schematic block diagram of the portable communication device 40a of the present invention. As previously discussed, the portable communication device 40 is carried by the user in either the local service area served by the local wireless network 24a or by the user in the remote service area serviced by the remote wireless network 24b. Each of the portable communication devices 40 in the local service area and in the remote service area is identical. The portable communication device 40 comprises a plurality of antennas 210 and 212. The signals received on the antennas 210 and 212 are supplied to a switch 214. The switch 214 is activated by a signal quality measurement unit 220 to select either the signal from the antenna 210 or the signal from the antenna 212. The signal from the switch 214 is supplied to a duplexer 216. The duplexer 216 is connected to a receiver section 218 and a transmitter section 230 and duplexes them into a single line to be supplied to the switch 214.

The receiver section 218 receives the signal from the duplexer 216. The receiver section 218 has an operational amplifier 222 which receives a signal from the duplexer 216. The received signal, which is an RF wireless signal, is supplied to a mixer 224. An oscillator 226 supplies the frequency to the mixer 224 to produce an intermediate frequency signal. The intermediate frequency signal is then supplied to the signal quality measurement unit 220 which determines the strength of the signal and accordingly activates the switch 214 to select either the antenna 210 or 212. The intermediate frequency from the mixer 224 is then supplied to a demodulator 228. The output of the demodulator 228 is a voice encoded signal.

The voice encoded signal from the receiver 218 is supplied to a storage unit 240. The storage unit 240 comprises an A-to-D converter 242, in the event the signal from the demodulator 228 is an analog signal. In the event the received digital signal had been scrambled by the communication device 20, the digitized signal is then optionally descrambler by descrambler 244. The output of the descrambler 244 is then compressed by a voice compressor 246. From the voice compressor 246, the signal is then supplied to a solid state memory 248 for storage. The voice signal which is stored in the solid state memory 248 can be retrieved and is supplied to a voice decompressor 250. The decompressed voice signal from the voice decompressor 250 is then supplied to a D-to-A converter 252. The output of the D-to-A converter 252 is supplied to an operational amplifier 254 which is supplied to a speaker 256 through a switch 257 to generate an audio voice message.

The portable communication unit 40 also comprises a transmitter section 230. In the preferred embodiment, the portable communication unit 40 does not have a microphone for voice signal input. However, it does have a plurality of buttons and switches (discussed hereinafter) which can activate a number of control signals, encoded in the form of DTMF signals. These DTMF signals, produced by a DTMF generator 271, can then be supplied to the modulator 238, through a switch 239, for modulation. The output of the modulator 238 is supplied to a mixer 234. The mixer 234 is also supplied with a frequency signal from an oscillator 236. The mixer 234 converts the modulated signal into an RF mixed signal suitable for transmission. The mixed signal from the mixer 234 is supplied to an operational amplifier 232 which is then supplied to the duplexer 216 and to one of the two antennas 210 or 212.

The received voice signal is also supplied to a controller 260. The controller 260 controls the frequency supplied to the oscillator 226 in the receiver section 218 and the frequency of oscillation supplied to the oscillator 236 in the transmitter section 230. The controller 260 also supplies the control signals to the modulator 238. In addition, the controller controls the during playback 248 during playback and is also an interface to a display unit 262, a keypad 264, and a vibrator 266. Finally, the controller controls the D-to-A converter 252.

The controller 260 also has a unique terminal identifier 270. This would be in the nature of the "telephone number" of the portable unit 40. The terminal identifier 270 is supplied to a power controller 272. A clock signal generated by a clock 268 is supplied to the controller 260 as well as to the power controller 272. Since the communication unit 40 is portable, it has a source of power, such as battery 276. The power from the battery 276 is also supplied to the power controller 272. The of the power controller 272 supplies power to the transmitter module 230, the receiver module 218, the storage module 240, and the rest of the unit 40, such as the display 262, keypad 264, vibrator 266, etc. Finally, a charger 274 can charge the power controller 272 and the battery 276.

Operation

The telecommunication system 10 of the present invention operates in the following manner. Users through the telephones 12 would dial the terminal identifier for the communication device 20. Thus, users through their telephone, connected directly to the local wired network 16a or indirectly through their PBX 14, are connected to the communication device 20a. When a user is connected to the communication device 20a, the controller 114 would generate a greeting message. This is accomplished by the reply and acknowledgement unit 132 retrieving a stored digitized prerecorded voice message from the solid state memory 134. This message is then converted to analog form and is supplied back to the user through the local wired network 16a. The message would prompt the user to leave messages for the roaming person carrying the portable communication unit 40. The message would prompt the user to leave the voice message. In addition, the controller 114 would prompt the user to enter via the numeric (including * and #) buttons on the telephone 12 the terminal identifier of the portable communication unit 40 to which the voice message should be forwarded and the manner in which delivery of the voice messages should be accomplished. This can take the form of urgent, normal, or economic delivery. In addition, through the use of the numeric buttons (having alpha representation) (including * and #), an alphanumeric text message can also be delivered. Such a text message can be displayed on the display of the portable communication device 40. The voice messages are stored on the disk 120. The terminal identifier of the user to whom the voice messages are to be delivered, and the manner of the delivery, as generated by the DTMF codes are then decoded by the DTMF decoder 130 and are stored in the memory 141 associated with the storage and playback control 142.

Thereafter, the delivery of the voice messages stored on the disk 120 can occur in one of three ways: an urgent delivery, a normal delivery or an economical delivery. Each of the ways of delivery will be discussed hereinafter.

In the urgent delivery category, as soon as the voice message is recorded on the disk 120, the storage and playback control unit 142 would activate the DTMF generator 144. The storage and playback control 142 would then supply the terminal identifier of the user to whom the voice message is to be delivered from the memory 141 to the DTMF generator 144 which generates the appropriate DTMF codes to the local MTSO unit 22a. The switch 127 would have been set so that that the output of the digital-to-analog converter 126 would be supplied to the second duplexer and interface unit 128. Assuming that the intended user is in the local service area, the portable communication unit 40 of the intended user having the terminal identifier would have had its transmitter section 240 activated periodically (to be discussed hereinafter) such that it would be in contact with the wireless network 24a and to the local MTSO 22a. Thus, the DTMF signals representative of the terminal identifier, supplied by the communication device 20, would then establish communication with the portable communication unit 40. The storage and playback control 142 would retrieve the voice message from the disk 120 and transmit it to the portable communication unit 40.

The voice signal is then received by one of the two antennas 210 or 212 of the portable communication unit 40. The RF signal is then converted to intermediate frequency and is digitized and stored in the solid state storage memory 248. The controller 260, sensing a message has been received, would display a notification of message receipt on the display unit 262. In addition, the controller 260 would also initiate the vibrator 266 for a brief, predetermined period of time to alert the user to the receipt of the voice message. The user upon activating one of the buttons on the keypad 264 which controls the playback of the message from the solid state memory 248 would cause the controller 260 to initiate playback of the message from the memory 248. This voice signal would then be decompressed and converted into an analog signal by the D-to-A converter 252 and is played back as an audio message on the speaker 256.

In the event the user is not in the local service area, the voice signals, the terminal identifier, and the manner of delivery are forwarded to the remote communication device 20b. The remote communication device 20b receives the voice signals, terminal identifier, and the manner of delivery, as if a user had inputted that data through a telephone.

In another mode of delivery, the normal mode, the storage of the voice signals occur as previously discussed. However, the storage and playback control unit 142 waits until it has received a control signal from the local MTSO unit 22a, through the MTSO status circuit 140 indicating that the wireless network 24a is at non-peak usage and thus has capacity to receive transmission. Since the wireless network 24a has a limited capacity, under "normal" delivery mode, the voice signals stored on the disk drive 120 may be delayed for a time period before they are forwarded onto the wireless network 24a. Depending upon the usage of the wireless network 24a, this delay can be on the order of minutes or even hours if the voice signals is received by the communication unit 28 during "peak usage". The advantage of this method of delivery to the service provider of the wireless network 24 is that the voice signals are transmitted during periods in which the network 24 is not at peak usage, thereby maximizing the utilization factor of the network 24.

In yet another embodiment of the normal mode of delivery, the voice signals are stored on the disk 120, in real time, as received, but are transmitted, or delivered periodically and substantially in equal amounts, to the wireless network 24, without the need for the feedback control signal from the MTSO unit 22a. In this mode, the voice signals can be delivered periodically, for example, based upon the average rate of voice signals received over a set period of time, such as one hour. Thus, for example, although 30 messages of one minute duration each may be received in the first fifteen (15) minutes of an hour, the communication device system 20 would transmit those messages to the wireless network 24 at the rate of one message every two minutes. Similar to the first embodiment for normal delivery described heretofore, this mode of delivery evens out the load requirement on the wireless network 24, such that it avoids, to the extent possible peak usage requirement. In this embodiment, however, the control signal from the MTSO unit 22 and the control logic to respond to that control signal are not required.

Finally, the system 10 has the ability to receive and forward voice signals in an economic mode. In the economic mode, the user specifies an off peak hour (usually night—ensuring off-peak usage) for transmission by the controller 114 to deliver the voice signals onto the wireless network 24a. Such off peak transmission typically occurs after normal business working day hours when fewer users are using the wireless network 24a. Of course, the delay between the receipt and storage of the voice signals on the disk 120 and the delivery thereof onto the wireless network 24a can be on the order of at least several hours.

Since the portable unit 40 must operate on battery power alone, there is a battery saving feature associated with the portable unit 40. Each of the portable unit 40 has a terminal identifier stored therein in the I.D. 270. The terminal identifier along with the clock signal from the clock 268 are supplied to a power controller 272. The battery 276 supplies power to the power controller 272. The power controller 272, based upon the terminal I.D. 270, would cause power from the battery 276 to be supplied intermittently to all the modules within the portable unit 40. For example, since each terminal I.D. has a terminating digit ranging from 0 to 9, depending upon the terminating digit in the terminal I.D. 270, the power controller 272 would "turn on" the portable unit 40 six (6) seconds in every minute in its assigned time slot. Thus, for example, if the terminal I.D. ends in the digit "0", the power control 272 would cause power to be supplied to the modules within the portable unit 40 during the time period from 0 seconds to 6 seconds of every minute. During the time power is supplied to the modules within the portable unit 40 the receiver section 240 would listen for communication addressed to it from the wireless network 24a. If there is no message intended for the portable unit 40, during this time, the portable unit 40 would then power down and it would turn itself off for the next 54 seconds, thereby saving battery power. If during the six seconds in which it is activated or is "awake", a voice signal is being attempted to be transmitted from the local MTSO 22a to that portable unit 40, the receipt of a signal from the wireless network 24a by the receiving section 218 would cause the controller 260 to activate the power controller 272 to respond to the MTSO 22a transmission and to maintain it in the operating condition so the power is then continuously supplied by the battery 276 to the portable unit 40 to receive the entire message.

Additionally, in future cellular network protocols, the wireless network 24a can track the movement of the portable unit 40, if the portable unit 40 has the required compatibility features. under this protocol, each local MTSO 22a transmits an ID unique to that MTSO in its service area. The transmission by the local MTSO 221 also sets a bit that requires the users within its service area to register with it when entering the service area. The portable communication unit 40 would then send a short (on the order of 0.25 seconds) burst of 10 kbps FSK data to register with the local MTSO 22a. This occurs when the portable unit 40 enters into the service area.

Once a message is received by the portable unit 40, the controller 260 would automatically display the receipt of the message on the display 262, activate the vibrator 266 to indicate the receipt of a message, and initiate the transmission of a DTMF signal through the modulator 238 of the transmitter section 230 back to the communication device 20, acknowledging the receipt of the voice signal transmitted therefrom. In this manner, active feedback acknowledgement is accomplished automatically. In addition, the controller 260 can cause a DTMF signal to be automatically transmitted to the communication device 20 after each of the stored voice signals from the solid state memory 248 is retrieved. Further, the controller 260 can automatically initiate the transmission of a DTMF signal to the communication device 20 after the solid state memory 248 is full or is nearly full, indicating to the communication device 20 the filled status of the solid state memory 248. In addition, the user can activate a button on the keypad 264 which is tantamount to a "DND" or a "Do Not Disturb" signal. The activation of the key on the keypad 264 would cause the controller 260 to initiate yet another, different, DTMF signal to be transmitted back to the communication device 20 to signify that irrespective of the availability of the transmission capacity as denoted by the MTSO status 140, the storage and playback control unit 142 should not transmit any voice signals to that particular portable unit 10. Of course, urgent messages may override the "DND" status.

Finally, after a user has retrieved a voice message from the solid state memory 248 of its portable unit 40, it can activate any of a number of switches on the keypad 264 which would cause various DTMF signals to be transmitted back to the communication device 20. The user activated buttons on the keypad 264 would signify to the communication device 20 a response to the voice message received. Thus, if the voice message retrieved is a question message requesting the user of the portable unit 40 to acknowledge through simple answers such as "yes", or "no", the activation of a particular key on the keypad 264 would cause a DTMF signal to be transmitted to the communication device 20. That DTMF signal is then decoded by the DTMF decoder 130 and is translated by the reply and acknowledgement unit 132. When the originating user who initiated the voice question message calls the communication device 20, the user can poll the memory 134 to determine if an answer has been received back from the recipient user. In this manner, communication without the use of microphone and interface circuits converting analog voice signals is needed for the portable unit 40.

Finally, referring to FIG. 4, there is shown a circuit diagram wherein the speaker 256 of the portable unit 40 can be used in an emergency to transmit a voice message similar to a microphone. In this circuit, the speaker 256 acts as a microphone to convert audio sound signal into an electrical signal. Switches 257 and 239 are under the control of the controller 260 and are switched directing the electrical signal from the speaker 256 to an op amp 255 to the switch 239 to the modulator 238.

As can be seen from the foregoing, there are many advantages to the system and communication units of the present invention. The present invention offers the ability to communicate with mobile users in an effective manner using existing cellular wireless networks and wired networks. In addition, the system 10 has the capability of efficiently utilizing a wireless network in periods of under-utilization. Further, since the portable units 40 can store and retrieve messages, and using the DTMF signals to acknowledge messages, they can effect communication in one way and can effect rudimentary communication in two directions including acknowledgement of voice question messages. Finally, with the speaker usable as a microphone, the portable unit 40 in an emergency, can be used for transmitting emergency voice messages, such as to emergency facilities of ambulance, fire or police.

What is claimed is:

1. A telecommunication system for receiving and forwarding a plurality of voice signals, said system comprising:
   a first communication network for receiving the plurality of voice signals and for transmitting the plurality of voice signals;
   a first communication means, connected to said first communication network for receiving the plurality of voice signals, storing the plurality of voice signals, and retrieving a portion thereof for transmission;
   a second wireless public carrier communication network in communication with said first communication means to receive the portion of voice signals therefrom and for transmitting the portion of voice signals and having means for generating a control signal indicative of said wireless network having transmission capacity;
   a plurality of second communication means; each of said second communication means including means for communicating with said wireless network to receive one of the voice signals; a second storage means for storing a received one voice signal; a second playback means for retrieving a voice signal stored on the second storage means; and a second control means for controlling said second playback means; and
   wherein said first communication means including means for receiving the control signal from the wireless network; means for receiving the plurality of voice signals transmitted on said wired network; a first storage means for storing a received plurality of voice signals; a first playback means for retrieving a portion of the stored plurality of voice signals; and a first control means for controlling said first playback means to transmit the retrieved portion of voice signals to said wireless network, in response to said control signal indicative of said wireless network having the capacity to receive the portion of stored voice signals.

2. The system of claim 1 wherein each of said plurality of voice signals is an analog signal.

3. The system of claim 1 wherein each of said plurality of voice signals is a digital signal.

4. The system of claim 1 wherein each of the portion of the stored plurality voice signals is a digital signal.

5. The system of claim 3 wherein said first communication means further comprising means for compressing said plurality of digital signals.

6. The system of claim 1 wherein said first communication means further comprising:
   means for encoding each of said plurality of voice signals from said first storage means to produce an encoded voice signal and for transmitting the plurality of encoded voice signals to said second wireless network, with each encoded voice signal transmitted to a different one of said plurality of second communication means; and wherein each of said plurality of second communication means further comprising means for decoding the received one voice signal.

7. The system of claim 1 wherein said means for communicating of each of said plurality of second communication means further comprising:
   a plurality of antenna means for receiving one of the plurality of voice signals from said wireless network.

8. The system of claim 1 wherein each of said plurality of second communication means further comprising:
   means for automatically transmitting DTMF signals to said first communication means in response to receipt of the one voice signal.

9. The system of claim 1 wherein each of said plurality of second communication means further comprising:
   means for automatically transmitting DTMF signals to said first communication means after each of the stored voice signals from said second storage means is retrieved.

10. The system of claim 1 wherein each of said plurality of second communication means further comprising:
    means for automatically transmitting DTMF signals to said first communication means in response to said second storage means being full.

11. The system of claim 1 wherein each of said plurality of second communication means further comprising:
    means for transmitting DTMF signals to said first communication means in response to a user activatable means to cease storage of additional voice signals.

12. The system of claim 1 wherein each of said plurality of second communication means further comprising:
    user activatable means for transmitting DTMF signals to said first communication means in response to a voice signal retrieved from said second storage means.

13. The system of claim 1 wherein each of said plurality of second communication means further comprising:
    speaker means for generating a voice message; and
    means for activating said speaker means as microphone means for transmitting a voice message.

14. The system of claim 1 wherein each of said plurality of second communication means has a terminal identifier and further comprising:
    power means for supplying power to said means for communicating with said wireless network;
    switch means for causing power to be supplied from said power means to said communicating means in one mode, and for causing power not to be supplied in another mode; and
    timing means, responsive to said terminal identifier, to activate periodically said switch means in said one mode.

15. The system of claim 14 wherein each of said plurality of second communication means further comprising:
    means, responsive to the receipt of said voice signal from said wireless network, to maintain said switch means in said one mode.

16. A telecommunication system for receiving and forwarding a plurality of voice signals, said system comprising:
    a first communication network for receiving the plurality of voice signals and for transmitting the plurality of voice signals;
    a first communication means, connected to said first communication network for receiving the plurality of voice signals, storing the plurality of voice signals, and retrieving a portion thereof for transmission;
    a second wireless public carrier communication network in communication with said first communication means to receive the portion of voice signals therefrom and for transmitting the portion of voice signals;
    a plurality of second communication means; each of said second communication means including means for communicating with said wireless network to receive one of the voice signals; a second storage means for storing a received one voice signal; a second playback means for retrieving a voice signal stored on the second storage means; and a second control means for controlling said second playback means; and
    wherein said first communication means including means for receiving the plurality of voice signals transmitted on said wired network; a first storage means for storing a received plurality of voice signals; a first playback means for retrieving a portion of the stored plurality of voice signals; and a first control means for controlling said first playback means to transmit the retrieved portion of voice signals to said wireless network, periodically and substantially evenly over a period of time, substantially at a rate equal to the plurality of voice signals received by said first communication means, in said period of time.

17. The system of claim 16 wherein each of said plurality of voice signals is an analog signal.

18. The system of claim 16 wherein each of said plurality of voice signals is a digital signal.

19. The system of claim 16 wherein each of the portion of the stored plurality voice signals is a digital signal.

20. The system of claim 18 wherein said first communication means further comprising means for compressing said plurality of digital signals.

21. The system of claim 16 wherein said first communication means further comprising:

means for encoding each of said plurality of voice signals from said first storage means to produce an encoded voice signal and for transmitting the plurality of encoded voice signals to said second wireless network, with each encoded voice signal transmitted to a different one of said plurality of second communication means; and wherein each of said plurality of second communication means further comprising means for decoding the received one voice signal.

22. The system of claim 16 wherein said means for communicating of each of said plurality of second communication means further comprising:

a plurality of antenna means for receiving one of the plurality of voice signals from said wireless network.

23. The system of claim 16 wherein each of said plurality of second communication means further comprising:

means for automatically transmitting DTMF signals to said first communication means in response to receipt of the one voice signal.

24. The system of claim 16 wherein each of said plurality of second communication means further comprising:

means for automatically transmitting DTMF signals to said first communication means after each of the stored voice signals from said second storage means is retrieved.

25. The system of claim 16 wherein each of said plurality of second communication means further comprising:

means for automatically transmitting DTMF signals to said first communication means in response to said second storage means being full.

26. The system of claim 16 wherein each of said plurality of second communication means further comprising:

means for transmitting DTMF signals to said first communication means in response to a user activatable means to cease storage of additional voice signals.

27. The system of claim 16 wherein each of said plurality of second communication means further comprising:

user activatable means for transmitting DTMF signals to said first communication means in response to a voice signal retrieved from said second storage means.

28. The system of claim 16 wherein each of said plurality of second communication means further comprising:

speaker means for generating a voice message; and means for activating said speaker means as microphone means for transmitting a voice message.

29. The system of claim 16 wherein each of said plurality of second communication means has a terminal identifier and further comprising:

power means for supplying power to said means for communicating with said wireless network;

switch means for causing power to be supplied from said power means to said communicating means in one mode, and for causing power not to be supplied in another mode; and timing means, responsive to said terminal identifier, to activate periodically said switch means in said one mode.

30. The system of claim 29 wherein each of said plurality of second communication means further comprising:

means, responsive to the receipt of said voice signal from said wireless network, to maintain said switch means in said one mode.

\* \* \* \* \*